United States Patent [19]

Hara

[11] Patent Number: 4,571,600

[45] Date of Patent: Feb. 18, 1986

[54] NOZZLE BLOCKAGE PREVENTING UNIT IN AN INK JET SYSTEM PRINTER

[75] Inventor: Takafumi Hara, Kyoto, Japan

[73] Assignee: Sharp Kabushiki Kaisha, Osaka, Japan

[21] Appl. No.: 543,539

[22] Filed: Oct. 20, 1983

[30] Foreign Application Priority Data

Nov. 4, 1982 [JP] Japan ................................ 57-194146

[51] Int. Cl.[4] ............................................ G01D 15/18

[52] U.S. Cl. ................................................ 346/140 R

[58] Field of Search ..................... 346/140 IJ, 140 PD

[56] References Cited

U.S. PATENT DOCUMENTS

| | | | |
|---|---|---|---|
| 4,045,802 | 8/1977 | Fukazawa et al. | 346/140 PD |
| 4,144,537 | 3/1979 | Kimura et al. | 346/140 PD |
| 4,223,324 | 9/1980 | Yamamori et al. | 346/140 PD |
| 4,228,442 | 10/1980 | Krull | 346/140 PD |
| 4,364,065 | 12/1982 | Yamamori et al. | 346/140 PD |
| 4,410,900 | 10/1983 | Terasawa | 346/140 PD |
| 4,417,259 | 11/1983 | Maeda | 346/140 PD |

*Primary Examiner*—George H. Miller, Jr.

*Attorney, Agent, or Firm*—Birch, Stewart, Kolasch & Birch

[57] ABSTRACT

A nozzle blockage preventing unit is disposed at one end of the travelling zone of a carriage so as to confront a nozzle unit mounted on the carriage when the carriage is held stationary at the end of the travelling zone. The nozzle blockage preventing unit includes a cam mechanism and a cam follower plate which moves toward the nozzle unit when the cam mechanism rotates. A capping rubber member is secured to the cam follower plate such that the capping rubber plate contacts the nozzle unit when the cam mechanism is rotated, thereby forming a closed chamber covering an orifice formed in the nozzle unit. A protection liquid is filled in the closed chamber in order to prevent the drying of the ink liquid contained in the nozzle unit when the ink jet system printer is placed in a non-operating condition for a considerably long period of time.

3 Claims, 2 Drawing Figures

NOZZLE BLOCKAGE PREVENTING UNIT IN AN INK JET SYSTEM PRINTER

BACKGROUND AND SUMMARY OF THE INVENTION

The present invention relates to an ink jet system printer and, more particularly, to a nozzle blockage preventing unit in an ink jet system printer.

Generally, an ink jet system printer includes a carriage which is driven to travel in the lateral direction in front of a platen supporting a record receiving paper. A nozzle unit is mounted on the carriage to emit ink droplets toward the record receiving paper so as to print symbols on the record receiving paper in a dot matrix fashion. The nozzle unit is provided with at least one orifice for emitting the ink droplets. The orifice normally has a diameter of several tens microns. Thus, the orifice portion may be blocked by dried ink liquid when air is inadvertently mixed into the ink liquid contained in the nozzle unit. Such a blockage is not desirable to ensure an accurate operation of the ink jet system printer.

To prevent the blockage of the nozzle orifice, in the conventional system, a control system is provided to intermittently emit ink droplets from the nozzle orifice even when the ink jet system printer is not placed in the actual print operation mode, or a nozzle capping mechanism is provided for covering the nozzle unit when the main power supply is switched off. However, the conventional nozzle blockage preventing system does not satisfactorily operate when the ink jet system printer body is transported from the dealer to the user, or when the ink jet system printer is placed in the non-operating condition for a considerably long period of time.

Accordingly, an object of the present invention is to provide an ink jet system printer which ensures an accurate printing operation.

Another object of the present invention is to provide a nozzle blockage preventing unit in an ink jet system printer, which prevents the blockage of the nozzle orifice even when the ink jet system printer is placed in the non-operating condition for a considerably long period of time.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a nozzle capping machanism is disposed at one end of the travelling zone of the carriage so that the nozzle capping mechanism can be placed into contact with the nozzle unit when the carriage is held at the home position. When the nozzle capping mechanism contacts the nozzle unit, a closed chamber is formed in front of the nozzle orifice. A protection liquid such as a mixture of water and glycol is filled in the closed chamber to protect the nozzle orifice. In a preferred form, the nozzle capping mechanism includes a slant bottom plate which functions to lead the protection liquid to a desired position when the nozzle capping mechanism is separated from the nozzle unit.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
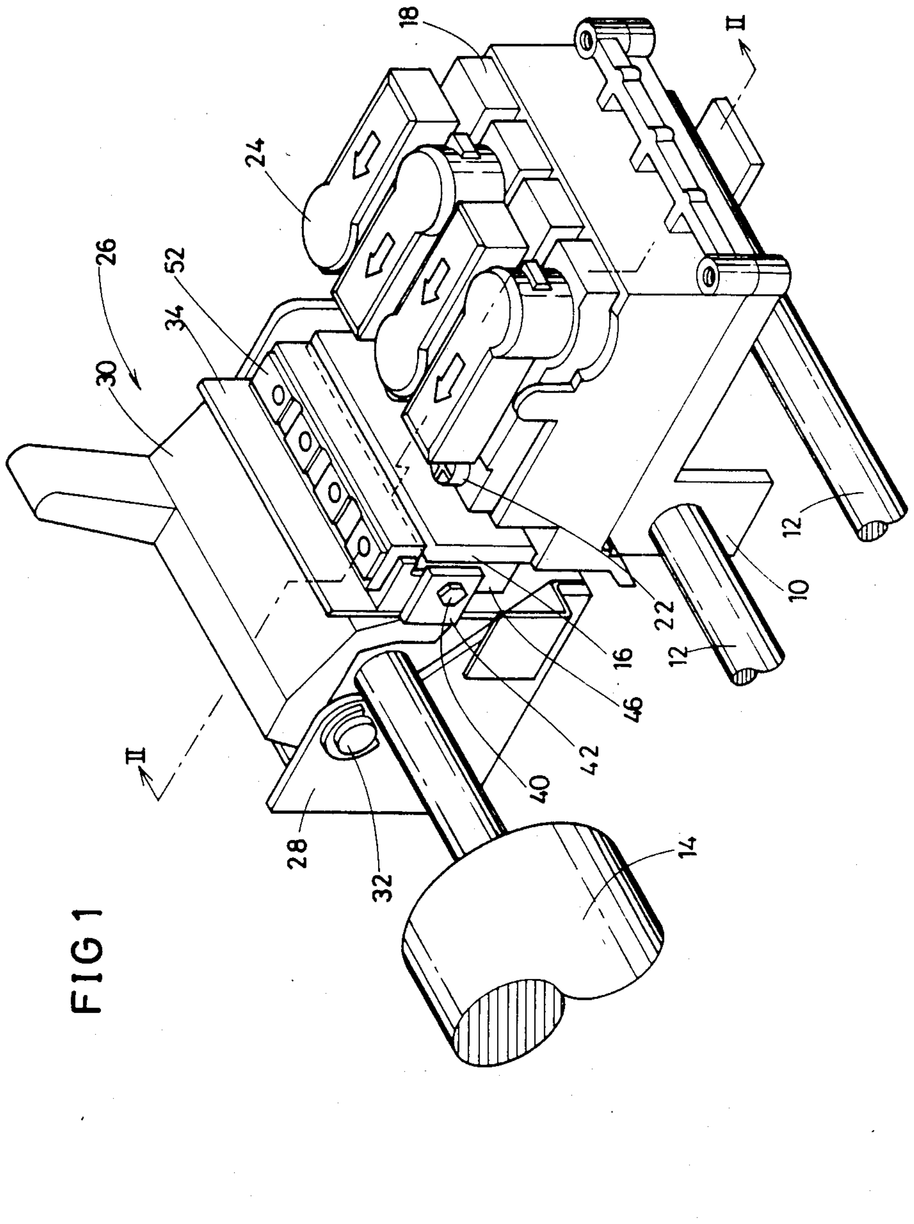
FIG. 1 is a perspective view of a portion of an embodiment of an ink jet system printer comprising the present invention.

FIG. 1 shows a portion of a color ink jet system printer of the ink-on-demand type, which employs an embodiment of a nozzle blockage preventing unit of the present invention.

Figure 2:
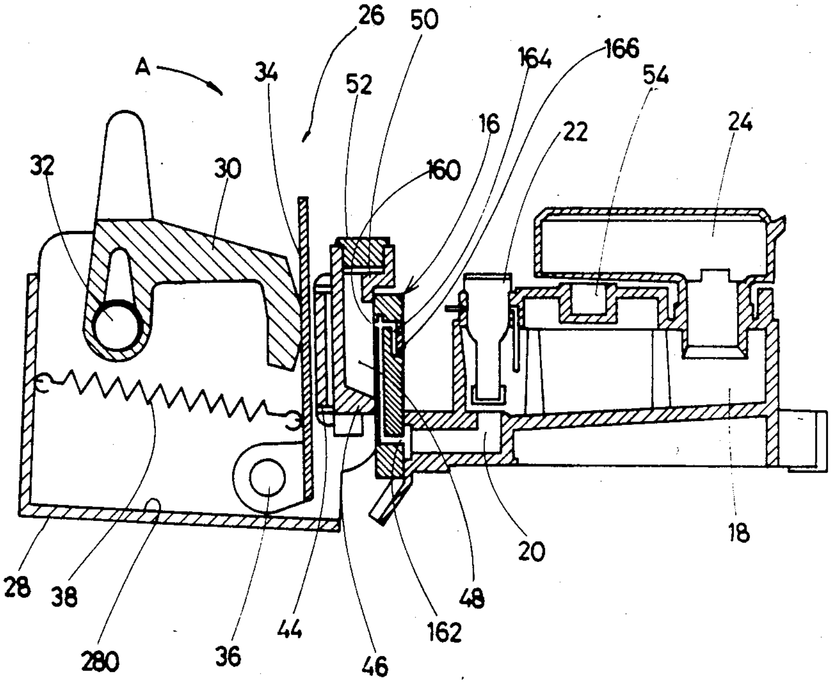
FIG. 2 is a sectional view taken along line II—II of FIG. 1.

A carriage 10 is slidably mounted on a pair of slide bars 12 which are disposed in front of a platen 14 to parallel the platen 14. A printer head is mounted on the carriage 10. The printer head includes a nozzle unit 16 which confronts a record receiving paper supported by the platen 14. The carriage 10 is connected to a drive mechanism so that the carriage 10 travels along the slide bars 12 in the lateral direction in front of the platen 14. That is, the nozzle unit 16 travels in the lateral direction in front of the platen 14 while the actual printing is conducted, thereby printing desired symbols on the record receiving paper in a dot matrix fashion through the use of ink droplets emitted from the nozzle unit 16. The printer head further includes an ink liquid reservoir 18 which communicates with the nozzle unit 16 via an ink liquid passage 20 and a valve 22 in order to supply ink liquid to the nozzle unit 16. The nozzle unit 16 includes at least four orifices 160 for emitting, for example, yellow ink droplets, magenta ink droplets, cyan ink droplets and black ink droplets. The ink liquid reservoir 18 is divided into four ink tanks which contain yellow ink, magenta ink, cyan ink and black ink. Four ink cartridges 24 are removably secured to the ink liquid reservoir 18. The first ink cartridge contains yellow ink and is connected to the first ink tank containing the yellow ink. The second ink cartridge contains magenta ink and is connected to the second ink tank containing the magenta ink. The third ink cartridge contains cyan ink and is connected to the third ink tank which contains the cyan ink. The fourth ink cartridge contains black ink and is connected to the fourth ink tank containing the black ink. Each of the nozzle orifices 160 is connected to receive the corresponding ink liquid from the ink liquid passage 20 via a capillary tube portion 162. At the back of each of the nozzle orifices 160, an ink chamber 164 is formed, to which a piezo electromechanical element 166 is attached as shown in FIG. 2. The nozzle orifice 160 emits ink droplets in response to the excitation signal applied to the piezo electromechanical element 166.

At one end of the sliding zone of the carriage 10, a nozzle blockage preventing unit 26 of the present invention is disposed to face the nozzle unit 16 when the carriage 10 is held stationary at the end of the sliding zone. The nozzle blockage preventing unit 26 includes a holder 28, a cam 30 rotatably secured to a shaft 32, and a cam follower plate 34. The cam follower plate 34 is rotatably supported by a shaft 36 and is pulled by a spring 38 to follow the surface of the cam 30. When the cam 30 is rotated in a direction shown by an arrow A in FIG. 2, the cam follower plate 34 moves toward the nozzle unit 16. A shaft 40 is secured to the cam follower plate 34 via an angle 42. A supporting plate 44 is rotatably secured to the shaft 40. A capping rubber member 46 is secured to the supporting plate 44. When the cam 30 is rotated in the direction shown by the arrow A, the capping rubber member 46 contacts the nozzle unit 16 to form four closed chambers 48 therebetween, each of the closed chambers 48 covers the corresponding orifice 160. The capping rubber member 46 is provided with four inlets 50 communicating with the corresponding closed chambers 48, respectively. A protection liquid such as a mixture of water and glycol is introduced into the closed chamber 48 through the inlet 50 when the capping rubber member 46 is brought into contact with the nozzle unit 16, thereby protecting the orifice 160. Caps 52 cover the inlets 50 to seal the closed chambers 48, respectively. The holder 28 includes a slant bottom plate 280 for directing the protection liquid to a desired position when the capping rubber member 46 is separated from the nozzle unit 16.

An operational mode of the nozzle blockage preventing unit 26 is as follows. When the ink jet system printer is to be placed in the non-operating condition for a considerably long period of time, the carriage 10 is shifted to the right end portion of the sliding zone to confront the nozzle blockage preventing unit 26. The cam 30 is rotated in the direction shown by the arrow A to shift the cam follower plate 34 toward the nozzle unit 16. The capping rubber member 46 contacts the nozzle unit 16 to form the four closed chambers 48 which cover the four orifices 160, respectively. Then, the valve 22 is rotated to close the ink liquid passage 20, and the caps 52 are removed. The protection liquid is filled in each of the closed chambers 48 and, then, the caps 52 are fitted in the inlets 50 to seal the closed chambers 48. In this way, the drying of the ink liquid is prevented. Therefore, the orifice portion will not become blocked even when the ink jet system printer is placed in the non-operating condition for a considerably long period of time.

When the ink jet system printer is transported a long distance, the ink cartridges 24 are removed from the ink liquid reservoir 18, and air openings 54 are closed.

When the ink jet system printer is to be placed in the operating condition after the long time interval, the ink cartridges 24 are set on the ink liquid reservoir 18, and the air openings 54 are opened. The valve 22 is rotated to open the ink liquid passage 20, and the caps 52 are removed. Thereafter, the cam 30 is rotated in the direction counter to the arrow A. The capping rubber member 46 is separated from the nozzle unit 16 to open the closed chambers 48. The protection liquid is directed to a desired position by means of the slant bottom plate 280 formed in the holder 28.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An ink jet system printer comprising:

a carriage driven to travel in front of a platen;

a printer head mounted on said carriage, said printer head including a nozzle unit provided with at least one orifice for emitting ink droplets toward said platen; and a nozzle blockage preventing unit disposed at a portion of a travelling zone of said carriage so as to confront said nozzle unit when said carriage is held stationary at said portion of the travelling zone;

said nozzle blockage preventing unit comprising a cam mechanism, a cam follower plate movable toward said nozzle unit when said cam mechanism is rotated, and a capping rubber member secured to said cam follower plate, wherein said capping rubber member contacts said nozzle unit when said cam follower plate moves toward said nozzle unit, thereby forming a closed chamber to cover said orifice, an inlet formed at an upper section of said capping rubber member for introducing a protection liquid into said closed chamber when said capping rubber member contacts said nozzle unit;

wherein said nozzle blockage preventing unit is enclosed by a holder, said holder including a slant bottom plate for directing said protection liquid to a desired position when said capping rubber member is separated from said nozzle unit to open said closed chamber.

2. An ink jet system printer comprising:

a printer head and platen movable in relation to each other;

said printer head comprising a nozzle having at least one orifice for emitting ink droplets;

a nozzle covering means located opposite said printer head in at least one position of said printer head;

said nozzle covering means comprising a capping means for engaging said nozzle in sealing engagement therewith in the region of said at least one orifice and for defining, along with at least a portion of said nozzle, a fluid-tight chamber surrounding said orifice for maintaining orifice protection liquid in contact with said orifice;

said capping means comprising an opening therein for introducing orifice protection liquid into said chamber into contact with said orifice;

said nozzle covering means further comprising a closure means for said opening for maintaining said liquid in said chamber, and means for moving said capping means into and out of engagement with said nozzle; and means for directing said orifice protection liquid in said chamber away from said printer head when said capping means is disengaged from said nozzle.

3. A combination comprising:

an ink jet nozzle having an orifice for emitting droplets;

cover means for sealingly engaging said nozzle for defining a fluid-tight chamber surrounding said orifice;

orifice protection liquid in said chamber in contact with said orifice;

opening means in said cover means for introducing said liquid into said chamber when said cover means is sealingly engaged with said nozzle;

closure means for said opening for maintaining said liquid in said chamber; and means for directing said orifice protection liquid in said chamber away from said printer head when said cover means is disengaged from said nozzle.

* * * * *